United States Patent
Salama

(10) Patent No.: US 6,911,805 B2
(45) Date of Patent: Jun. 28, 2005

(54) APPARATUS FOR POWER TRANSMISSION

(75) Inventor: Mikko Salama, Voikkaa (FI)

(73) Assignee: Ricotec Oy, Vantaa (FI)

( * ) Notice: Subject to any disclaimer, the term of this patent is extended or adjusted under 35 U.S.C. 154(b) by 58 days.

(21) Appl. No.: 10/470,717

(22) PCT Filed: Feb. 1, 2002

(86) PCT No.: PCT/FI02/00077

§ 371 (c)(1), (2), (4) Date: Jul. 31, 2003

(87) PCT Pub. No.: WO02/065627

PCT Pub. Date: Aug. 22, 2002

(65) Prior Publication Data

US 2004/0095099 A1 May 20, 2004

(30) Foreign Application Priority Data

Feb. 2, 2001 (FI) .............................................. 20010198

(51) Int. Cl.$^7$ .......................... H02H 7/06; H02P 11/00; H02M 5/458
(52) U.S. Cl. ........................................ 322/24; 363/37
(58) Field of Search ............................. 322/24, 28, 46, 322/26; 363/34, 35, 36, 37, 40, 41; 307/127

(56) References Cited

U.S. PATENT DOCUMENTS

| | | | |
|---|---|---|---|
| 4,447,868 A | | 5/1984 | Turnbull ........................ 363/81 |
| 4,894,763 A | * | 1/1990 | Ngo ............................... 363/35 |
| 5,373,223 A | | 12/1994 | Akagi et al. .................. 318/722 |
| 5,764,023 A | * | 6/1998 | Wieloch ........................ 318/803 |
| 5,831,842 A | * | 11/1998 | Ogasawara et al. ........... 363/40 |
| 6,118,676 A | * | 9/2000 | Divan et al. ................... 363/34 |
| 6,134,126 A | | 10/2000 | Ikekame et al. ............... 363/39 |
| 6,185,115 B1 | * | 2/2001 | Sul et al. ....................... 363/37 |
| 6,490,187 B2 | * | 12/2002 | Mori et al. .................... 363/147 |
| 6,570,778 B2 | * | 5/2003 | Lipo et al. ..................... 363/41 |

FOREIGN PATENT DOCUMENTS

| | | |
|---|---|---|
| EP | 0 762 623 A3 | 3/1997 |
| EP | 1 094 592 A2 | 4/2001 |
| FI | 75700 C | 3/1988 |

* cited by examiner

Primary Examiner—Darren Schuberg
Assistant Examiner—Julio Gonzalez
(74) Attorney, Agent, or Firm—Birch, Stewart, Kolasch & Birch, LLP

(57) ABSTRACT

Apparatus for the transfer of electric power produced by at least one multi-phase alternating-current generator (1) or generator unit into at least one multi-phase alternating-current power network ($U_u,U_v,U_w$), said apparatus comprising at least one control unit (4), at least one non-controlled rectifier bridge (2), a direct-current intermediate circuit and at least one controlled inverter bridge (3) for supplying d.c. power into an alternating-current power network, said inverter bridge (3) having fully gate-controlled semiconductor switches (V11–V16) in its upper and lower branches, and said control unit controlling the semiconductor switches (V11–V16) of the inverter bridge (3) so as to cause them to conduct in such manner that: —in the upper branch, the switch in each phase conducts substantially as long as the instantaneous value of the network phase voltage ($U_u,U_v,U_w$) in question is the most positive, and —in the lower branch, correspondingly the switch in each phase conducts substantially as long as the instantaneous value of the network phase voltage ($U_u,U_v,U_w$) in question is the most negative. The rectifier bridge (2) is connected directly to the inverter bridge (3) without a d.c. capacitor unit functioning as an intermediate energy storage. In addition, the direct current output from the rectifier bridge (2) is conducted directly into those two a.c. network phases in which the magnitudes of the instantaneous values of the voltages are highest, without current limitation by an inductor unit.

5 Claims, 2 Drawing Sheets

APPARATUS FOR POWER TRANSMISSION

This application is the national phase under 35 U.S.C. §371 of PCT International Application No. PCT/FI02/00077 which has an International filing date of Feb. 1, 2002, which designated the United States of America.

BACKGROUND OF THE INVENTION

Field of the Invention

The present invention relates to an apparatus for the transmission of electric power produced by a multi-phase alternating current generator to a multi-phase alternating-current power network, said apparatus comprising a control unit, a non-controlled rectifier bridge, a direct-current intermediate circuit and a controlled inverter bridge for supplying direct-current power into the alternating-current power network.

Description of Background Art

In the production of electric power, e.g. in hydropower and wind power stations, synchronous generators are generally used for the conversion of mechanical energy into electric energy. When a synchronous generator is connected directly to an electric power network, its speed of rotation must be exactly in synchronism with the frequency of the electric network. Thus, a drawback with such an arrangement is this very need for precise adjustment of rotational speed, which e.g. in wind power stations requires laborious adjustment of the blade angle.

There are prior-art control apparatuses that improve the situation in that the rotational speed of the generator need not be exactly constant. In such apparatuses, the a.c. power produced by the generator is rectified, smoothed in a d.c. capacitor functioning as an intermediate energy storage and then fed via an electronic power inversion stage into the electric network. The rectifier may consist of a fully controlled inverter circuit producing a continuously constant d.c. voltage from the voltage generated by the generator, which may vary within a large range. The rectifier may also be a non-controlled diode bridge circuit.

The constant d.c. voltage of the intermediate circuit is converted into an a.c. voltage by means of a circuit consisting of an inverter and a choke and fed into the electric network. The inverter is typically a bridge circuit formed from fully gate-controlled power semiconductor switches with diodes connected in parallel with them, the power semiconductor switches being typically controlled at a frequency of a few kHz. The harmonics generated in the line current by high-frequency operation are suppressed by means of a high-inductance network inductor.

In the circuit, the power supplied into the electric network can be controlled by the amplitude of the voltage produced by the inverter and its phase difference angle relative to the voltage of the electric network. It is preferable to adjust the amplitude and phase difference angle so that the current and voltage of the supply network are cophasal, i.e. $\cos\phi=1$.

In a solution applying these technical principles, the aim is to maintain a constant d.c. intermediate-circuit voltage by using a high-capacitance d.c. capacitor. The capacitor functions as an intermediate energy storage, allowing the rectifying and inverting circuits to work independently of each other, which is an advantage, e.g., in respect of control engineering.

The ratings of the capacitor unit are generally determined by the capacitor's ability to withstand the current and voltage load imposed on them as well as the required service life in extreme conditions. To calculate the current load, the current components generated by the rectifying and inverting circuits are generally first calculated separately and then summed quadratically. This is the procedure followed when the capacitor unit has a notably high capacitance, in which case the circuits can be regarded as separate circuits and their instantaneous values have no effect on each other. From this premise it follows that the capacitance of the capacitor unit becomes very high because the advantageous capacitor type, the electrolytic capacitor, has a relatively low current tolerance.

Thus, the above-described circuit has the disadvantage of requiring a large d.c. capacitor and a large network inductor as well as a complex inverter bridge control logic. The voltage produced by the inverter consists of columns of a height corresponding to the d.c. voltage, and the generation of these requires high-frequency operation of the power semiconductors, which again involves considerable switching losses and a need for efficient cooling.

A previously known possibility of implementing the inverter is a three-phase rectifier bridge circuit as disclosed in patent specification U.S. Pat. No. 4,447,868, which allows the power to flow either from the a.c. circuit into the d.c. circuit or conversely. According to the aforesaid patent, when the power is flowing from the d.c. circuit into the supply network, the rectifier transistors are controlled in such manner that the control unit controls their conduction so that the upper branch transistor, in the phase in which the instantaneous value of the supply voltage is highest, and the lower branch transistor, in the phase in which the instantaneous value of the supply voltage is lowest, are conducting. The circuit described in the aforesaid specification also requires the use of a complex inverter control logic as well as a large inductance and a large capacitance in the d.c. circuit.

All the prior-art devices described above need capacitors having a large capacitance as an energy storage as well as current-limiting inductors with a voltage across them that typically may be about 3–5% of the supply voltage, the inductors thus having a large inductance. Such components are bulky and expensive. Therefore, they are a very significant factor affecting the size and costs of the apparatus.

SUMMARY AND OBJECTS OF THE INVENTION

The object of the present invention is to eliminate the drawbacks of prior art and to achieve an arrangement that will allow the size of the apparatus to be minimized. The apparatus of the invention is characterized in that the direct current produced by the generator and rectifier bridge is fed directly into the electric network without intermediate storage of energy in a d.c. capacitor. No current-limiting inductor as required in prior art is needed, nor is measurement of direct or alternating current necessary as is required by inverter control logic.

In the apparatus of the invention, a rectifier bridge and an inverter bridge are connected directly together without a d.c. capacitor acting as an intermediate energy storage. The direct current is conducted directly into those two a.c. network phases in which the magnitudes of the instantaneous values of the voltages are highest. This action is accomplished by an arrangement where a control unit in a control apparatus controls fully gate-controlled semiconductor switches (such as e.g., Field Effect Transistor (FET) or Insulated Gate Bipolar Transistor (IGBT)) of the inverter bridge in such manner that:

in the upper branch, the switch in each phase conducts as long as the instantaneous value of the phase voltage in question is the most positive, and in the lower branch, correspondingly the switch in each phase conducts as long as the instantaneous value of the phase voltage in question is the most negative.

Thus, a situation is reached where both a large-capacitance d.c. capacitor functioning as an energy storage and a high-inductance current-limiting inductor are superfluous. In practice, it may be necessary to use a low-capacitance d.c. capacitor or a voltage clipper circuit in the d.c. intermediate circuit to suppress overvoltages appearing in switching situations, and a low-inductance a.c. inductor between the inverter and the supply network as a protection against network disturbances.

Additional advantages of the invention:

the control system required by the inverter bridge in a conventional circuit and the associated auxiliary voltage source can be replaced with a considerably simpler and cheaper control card small power losses (no losses in energy storage capacitors or current-limiting inductors, and insignificant switching losses in the controlled power semiconductors as they work at the frequency of the electric distribution network).

BRIEF DESCRIPTION OF THE DRAWINGS

In the following, the invention will be described in detail by the aid of examples with reference to the attached drawings, wherein.

DETAILED DESCRIPTION OF THE PREFERRED EMBODIMENTS

Figure 1:
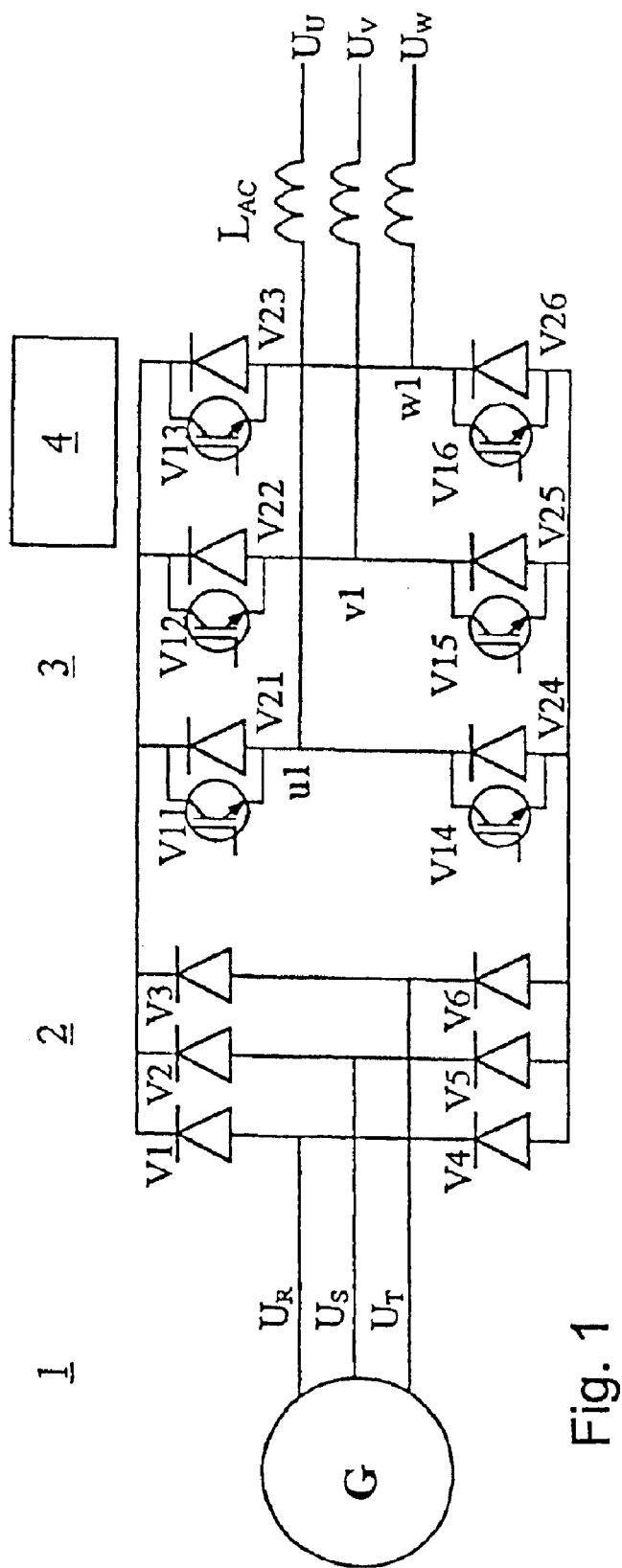
FIG. 1 represents an a.c. generator and its control apparatus.

FIG. 1 presents a three-phase alternating-current generator 1 and a control apparatus connected to it, through which the three-phase alternating current (phase voltages $U_R$, $U_S$, $U_T$) supplied by the generator is passed into a three-phase electric network (phase voltages $U_U$, $U_V$, $U_W$) having a constant frequency, e.g.: 50 Hz.

The control apparatus comprises a non-controlled full-wave rectifier bridge 2 for rectifying the three-phase alternating current supplied by the generator 1 and feeding it into the d.c. intermediate circuit, and a controlled inverter bridge 3, connected to it directly without a high-capacitance capacitor unit smoothing the direct current of the intermediate circuit, for passing the current of the d.c. intermediate circuit into a three-phase alternating-voltage network. The semiconductor switches of the inverter bridge are controlled by a control unit 4.

The rectifier bridge 2 consists of diodes V1–V6, and the inverter bridge 3 consists of fully gate-controlled power semiconductors, e.g.: IGBTs V11–V16 (phase U: V11, V14; phase V: V12, V15, and phase W: V13, V16), and diodes V21–V26 connected in parallel with these. To suppress any disturbances coming from the supply network and those transmitted into it, the circuit also comprises an inductor $L_{AC}$. To suppress overvoltage spikes occurring in switching situations or produced by the supply network, it may be necessary to connect e.g.: a low-capacitance capacitor or a varistor functioning as a voltage clipper between the terminals of the d.c. intermediate circuit between the rectifier and inverter bridges. However, that has no essential importance in respect of the present invention.

Figure 2:
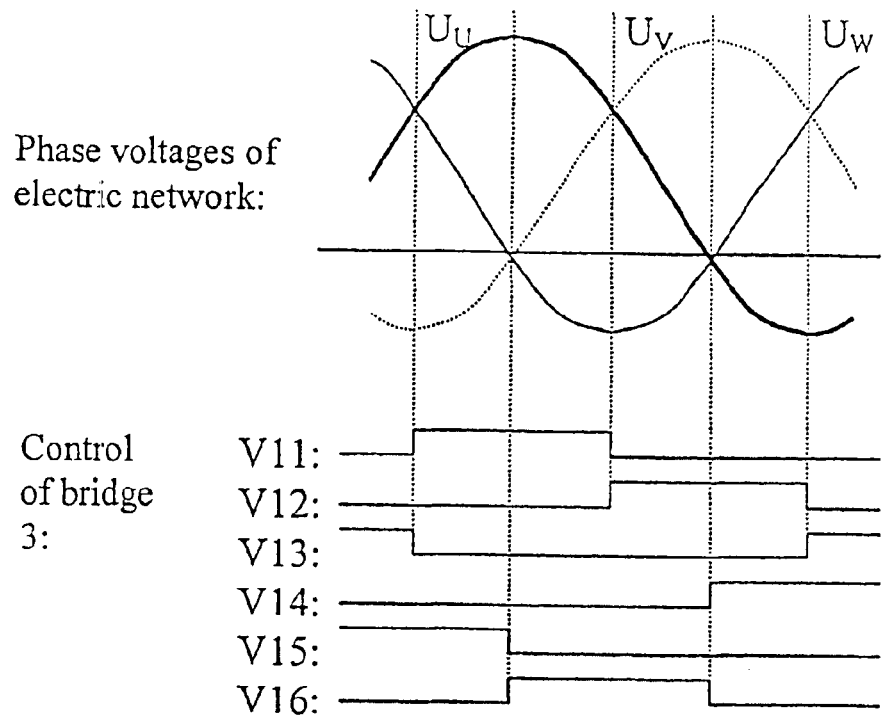
FIG. 2 illustrates the timing logic of the semiconductor switches.

FIG. 2 presents a timing logic according to which the controllable switches V11–V16 are controlled. For example, switch V11 is kept in the conducting state as long as the instantaneous value of phase voltage U of the electric network is more positive than the instantaneous values of the other phase voltages, and switch V14 is kept conducting as long as the instantaneous value of phase voltage U is more negative than the instantaneous values of the other phase voltages. The switches connected to phase voltages V and W are controlled on the same basic principle.

Figure 3:
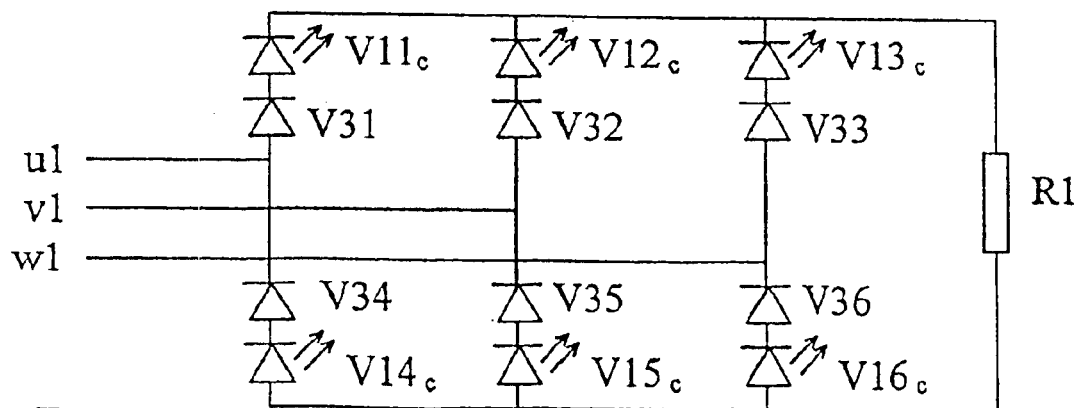
FIG. 3 represents the control electronics.

FIG. 3 shows how the above-described timing logic can be implemented by using optoisolators. In this context, only the circuit on the side of the light emitting diodes of the optoisolators is described. The pulse amplifier circuit connected on the side of the light receivers and producing the actual voltage and current pulse needed for the control of the power semiconductors according to the signal given by the optoisolator can be implemented in many known ways and it will not be described here.

The circuit shown in FIG. 3 is connected to the same supply voltage terminals u1, v1, w1 to which the inverter bridge 3 is also connected. The circuit comprises a diode bridge V31–V36, the optoisolators' emitter diodes V11c–V16c connected in series with the diodes and a resistor R1 connected to the d.c. terminals of the diode bridge. In the circuit, a current determined by the resistor R1 flows expressly through those emitter diodes that, according to the control logic presented in FIG. 2, are to give a control command to the semiconductor switches (power semiconductors) V11–V16 corresponding to them. For example, a current is flowing through emitter diode V11c only when phase voltage u1 is more positive than the other phase voltages. Thus, the semiconductor V11 corresponding to this diode conducts at exactly the right moment.

Let it be noted that the implementation of the control logic does not require the measurement of the power network current or the direct current as are required in solutions implemented according to prior-art techniques.

In accordance with the principles described above, the invention can also be applied to apparatus comprising a plurality of generators and rectifiers feeding a common d.c. intermediate circuit, or to apparatus in which a plurality of three-phase electric networks are connected to the same d.c. intermediate circuit.

It is obvious to the person skilled in the art that different embodiments of the invention are not limited to the examples described above, but that they may be varied within the scope of the claims presented below. Besides IGBTs, the fully controlled semiconductor switches used may also consist of other fully gate-controlled semiconductor switches, i.e. switches that can be turned on and off via the gate, such as transistors.

The features characteristic of the apparatus of the invention are specified in the claims presented below.

What is claimed is:

1. Apparatus for the transfer of electric power produced by at least one multi-phase alternating-current generator (1) or generator unit into at least one multi-phase alternating-current power network ($U_u$, $U_v$, $U_w$), said apparatus comprising at least one control unit (4), at least one non-controlled rectifier bridge (2), a direct-current intermediate circuit and at least one controlled inverter bridge (3) for supplying d.c. power into an alternating-current power network said inverter bridge (3) having fully gate-controlled semiconductor switches (V11–V16) in its upper and lower branches, and said control unit controlling the semiconductor switches (V11–V16) of the inverter bridge (3) so as to cause them to conduct in such manner that:

in the upper branch, the switch in each phase conducts substantially as long as the instantaneous value of the network phase voltage ($U_u$, $U_v$, $U_w$) in question is the most positive, and in the lower branch, correspondingly the switch in each phase conducts substantially as long as the instantaneous value of the network phase voltage ($U_u$, $U_v$, $U_w$) in question is the most negative wherein the rectifier bridge (2) is connected directly to the inverter bridge (3) without a d.c. capacitor unit functioning as an intermediate energy storage, and that the direct current output from the rectifier bridge (2) is conducted directly into those two a.c. network phases in which the magnitudes of the instantaneous values of the voltages are highest, without current limitation by an inductor unit.

2. Apparatus as defined in claim 1, wherein the control unit controls the semiconductor switches (V11–V16) of the inverter bridge (3) at the frequency of the electric network so that the semiconductor switches are controlled with a single continuous control pulse that continues throughout the duration of the conduction period of the semiconductor switch.

3. Apparatus as defined in claim 1, in which the alternating-current power network is a constant-frequency network, wherein the control unit controls the semiconductor switches (V11–V16) of the inverter bridge (3) at the constant frequency.

4. Apparatus as defined in claim 1, wherein the control unit (4) contains control elements for controlling the semiconductor switches (V11–V16) of the inverter bridge (3), said control elements being connected to the same phase voltage terminals (u1,v1,w1) as the inverter bridge (3).

5. Apparatus as defined in claim 4, wherein the control elements are optoisolators, and that the control unit comprises a diode bridge (V31–V36), the optoisolators' emitter diodes (V11c–V16c) connected in series with the diodes of the diode bridge, and a resistor (R1) connected to the direct-voltage terminals of the diode bridge, a current determined by said resistor (R1) flowing through those emitter diodes that, according to the control logic, are to give a control command to the corresponding semiconductor switches (V11–V16) of the inverter bridge (3).

* * * * *